(12) United States Patent
Menk et al.

(10) Patent No.: US 10,946,354 B2
(45) Date of Patent: Mar. 16, 2021

(54) DYNAMIC MIXER DISPENSE VALVE FOR TWO-COMPONENT HIGH-VISCOSITY HIGH-RATIO COMPOUNDS

(71) Applicants: Bruce H Menk, Costa Mesa, CA (US); Fabio H Okada, Aliso Viejo, CA (US)

(72) Inventors: Bruce H Menk, Costa Mesa, CA (US); Fabio H Okada, Aliso Viejo, CA (US)

( * ) Notice: Subject to any disclaimer, the term of this patent is extended or adjusted under 35 U.S.C. 154(b) by 239 days.

(21) Appl. No.: 15/917,362

(22) Filed: Mar. 9, 2018

(65) Prior Publication Data

US 2019/0275482 A1 Sep. 12, 2019

(51) Int. Cl.
*B01F 15/02* (2006.01)
*B01F 7/00* (2006.01)
*B05C 5/02* (2006.01)

(52) U.S. Cl.
CPC ...... *B01F 15/0261* (2013.01); *B01F 7/00341* (2013.01); *B01F 7/00633* (2013.01); *B01F 15/0292* (2013.01); *B05C 5/0237* (2013.01); *B01F 2215/006* (2013.01)

(58) Field of Classification Search
CPC .............. B01F 15/0261; B01F 7/00341; B01F 7/00633; B01F 2215/006; B01F 7/00141; B01F 2215/0039; B01F 15/0292; B01F 3/04531; B01F 3/04453; B29B 7/801; B29B 7/407; B29B 7/7447; B29B 7/7442; B05C 5/0233; B05C 5/0237

See application file for complete search history.

(56) References Cited

U.S. PATENT DOCUMENTS

| | | | | | |
|---|---|---|---|---|---|
| 2,847,196 A | * | 8/1958 | Franklin | ................. | B29B 7/826 366/160.3 |
| 2,857,144 A | * | 10/1958 | Gurley, Jr. | .......... | B01F 7/00816 366/295 |
| 2,868,518 A | * | 1/1959 | Corby, Jr. | ............... | B29B 7/404 366/172.1 |
| 3,035,775 A | * | 5/1962 | Edwards | ............... | B29B 7/7442 239/142 |
| 3,066,874 A | * | 12/1962 | Becker | .................. | B05B 7/1263 239/415 |
| 3,068,074 A | * | 12/1962 | Boekemeier | ............ | B29B 7/405 422/133 |
| 3,216,850 A | * | 11/1965 | Merrill | ................... | B21D 51/46 427/231 |
| 3,393,052 A | * | 7/1968 | Axelsson | ................ | B29B 7/404 422/133 |
| 3,545,680 A | * | 12/1970 | Ottaway | ................... | B05B 7/12 239/413 |

(Continued)

*Primary Examiner* — Tony G Soohoo
(74) *Attorney, Agent, or Firm* — Roy A. Ekstrand

(57) ABSTRACT

A dynamic mixer dispense valve and metering apparatus suitable for use in mixing and applying high viscosity, disparate viscosity, high ratio and/or relatively immiscible two part compounds that exhibit short cure times includes a housing supporting a pair of valve assemblies each coupled to respective sources of base and accelerator components. A pair of pneumatic valve actuator s control the operation of the valve assemblies to control the flow of components into a mixing chamber. Within the mixing chamber a mixer impeller is rotatably supported and coupled to a source of rotational power. An additional pneumatic valve actuator combination operates a further flow control to prevent undesired material loss following a shot cycle.

7 Claims, 8 Drawing Sheets

(56) References Cited

U.S. PATENT DOCUMENTS

| | | | | |
|---|---|---|---|---|
| 3,741,441 A * | 6/1973 | Eberle | ......................... | B29B 7/42 |
| | | | | 222/135 |
| 3,791,631 A * | 2/1974 | Meyer | .................... | B29B 7/7433 |
| | | | | 366/160.2 |
| 3,902,850 A * | 9/1975 | Lehnert | ................... | B29B 7/407 |
| | | | | 422/133 |
| 3,924,837 A * | 12/1975 | Knis | ....................... | B29B 7/405 |
| | | | | 366/98 |
| 4,671,942 A * | 6/1987 | Dietachmair | ........... | B05B 15/55 |
| | | | | 422/133 |
| 4,778,659 A * | 10/1988 | Inoue | ........................ | B29B 7/42 |
| | | | | 134/169 R |
| 6,105,822 A * | 8/2000 | Larsen | ................... | B29B 7/7442 |
| | | | | 222/134 |
| 10,086,341 B2 * | 10/2018 | Mader | ..................... | B01F 7/008 |
| 2019/0275482 A1 * | 9/2019 | Menk | ................... | B29B 7/7442 |

\* cited by examiner

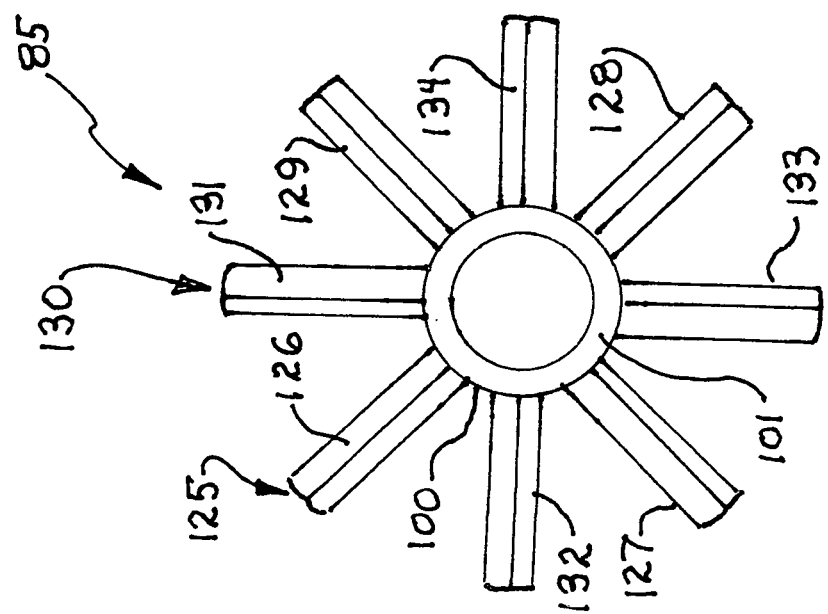
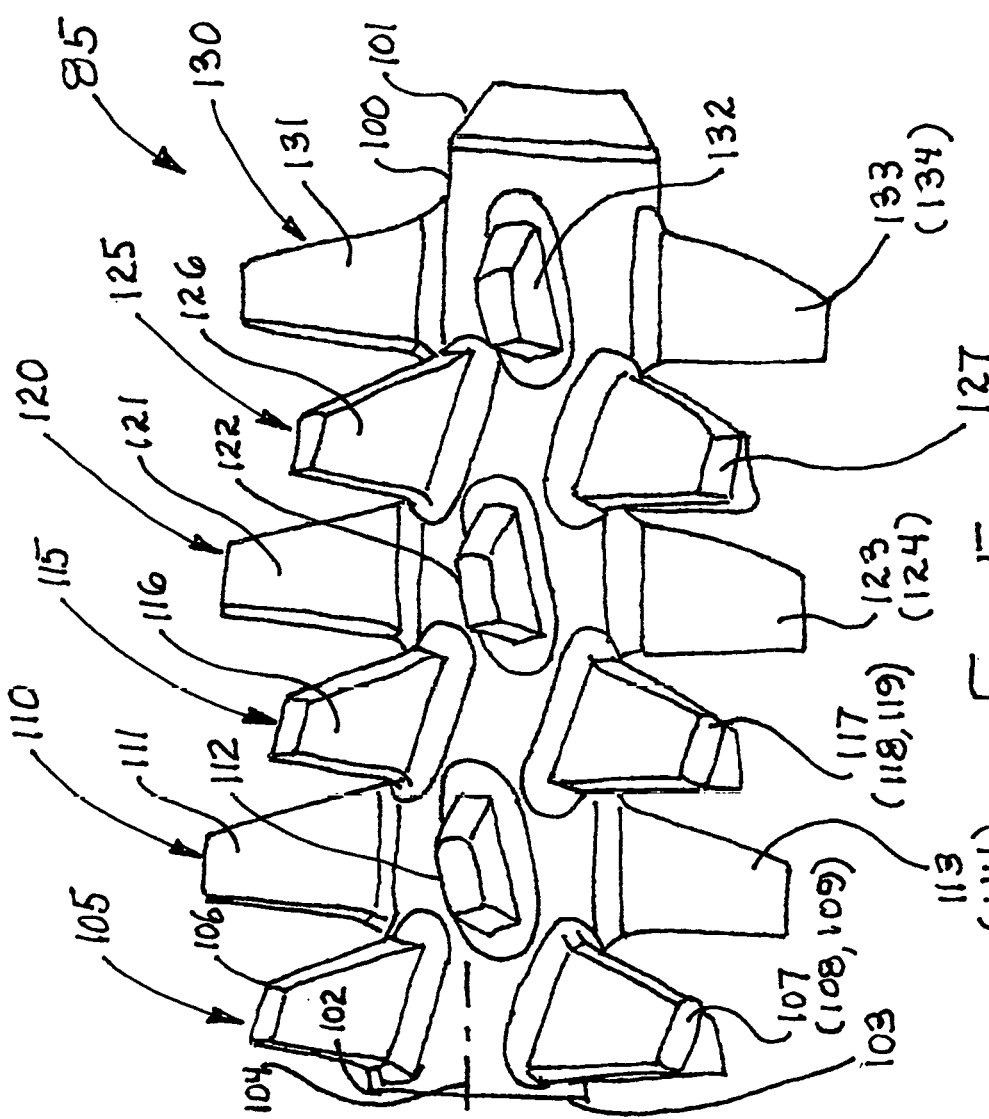

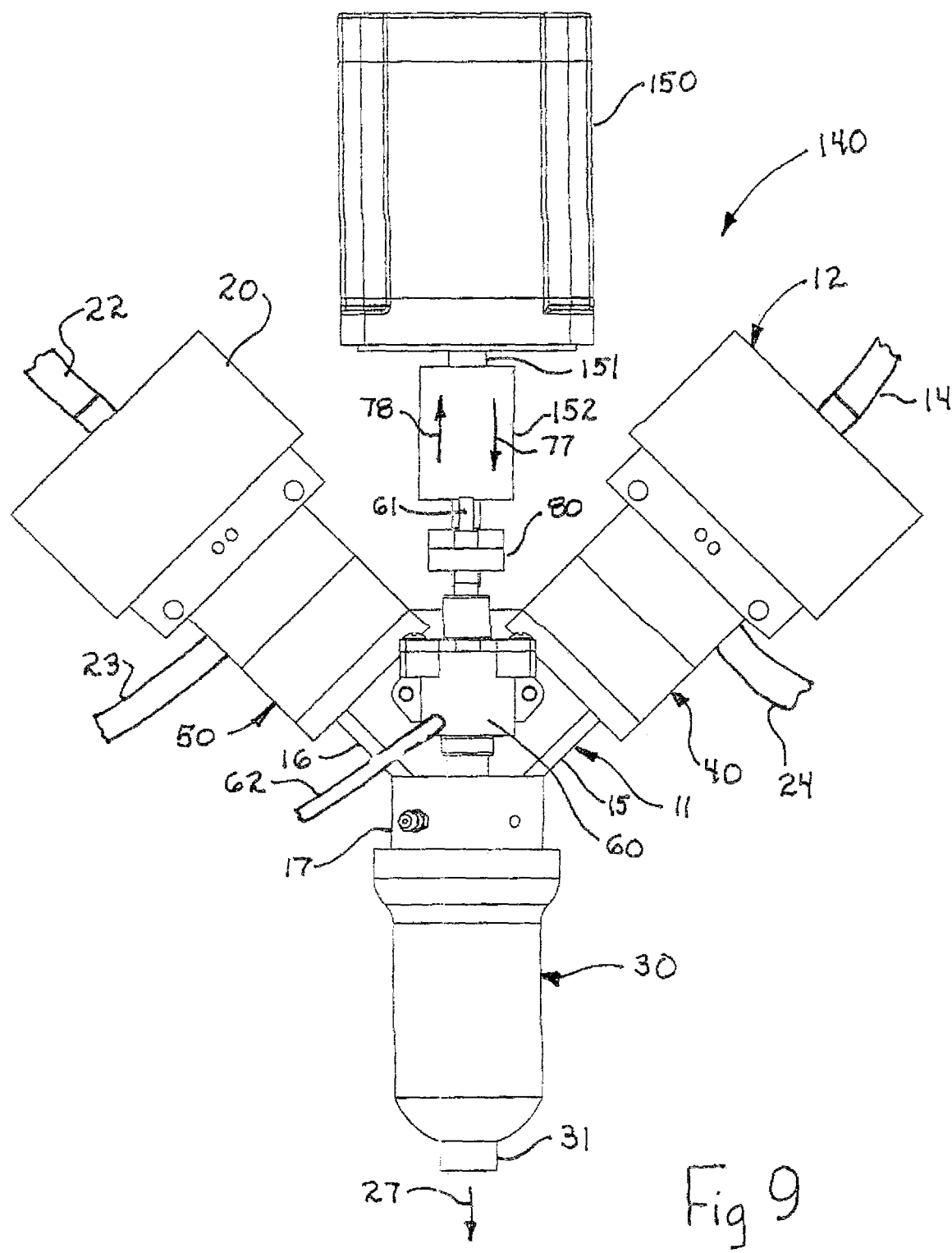

DYNAMIC MIXER DISPENSE VALVE FOR TWO-COMPONENT HIGH-VISCOSITY HIGH-RATIO COMPOUNDS

FIELD OF THE INVENTION

This invention relates generally to two component thermosetting compounds such as adhesives and sealants and particularly to apparatus for on demand mixing, metering and dispensing such compounds.

BACKGROUND OF THE INVENTION

In several Industries, such as aerospace manufacturing industries and the like, increased manufacturing efficiency, quality, and reliability are achieved by utilizing various thermosetting adhesive/sealants in the manufacturing process. This invention relates to a special class of (low slump) polysulfide corrosion inhibitive fuel tank sealants manufactured by companies such as PPG Aerospace and 3M Aerospace.

Two component thermosetting adhesives/sealant, often referred to generally as "thermosets", are comprised of a base component polymer and an accelerator catalyst component. When stored separately in their respective container the base and catalyst components typically have shelf lives of six to twelve months at room temperature. When the base and catalyst are mixed together the curing or "hardening" reaction begins. As the compound cures, the viscosity gradually increases until it becomes a solid. During time period following component mixing and preceding hardening, there is a period of useful application time known as "working time", so described because the mixed compound may be applied to the desired working surface as a viscous flowable material using any of a number of dispensers. Typical working times range from thirty minutes to two hours. For most manufacturing applications, the volume of usage makes the inefficiencies of hand mixing prohibitive due to the relatively short working time of the mixed compound. To overcome this disadvantage, dual component cartridge mixing systems or meter/mix dispensing machines are utilized. Most of these systems incorporate the use of a disposable static mixing nozzle. The advantage is that the compound is mixed and then quickly dispensed to the application shortly after mixing thereby minimizing the issue of limited working time.

Most adhesive/sealants can be meter/mix dispensed utilizing inexpensive disposable static mixing nozzles. Static mixing nozzles are relatively inexpensive and can be used to fill disposable cartridges for remote application or for direct application via robotic or handheld dispensing valves. These mixers are effective because many adhesive/sealant manufacturers formulate the compounds to have similar A/B component viscosities, close mixing ratios i.e., 1:1, 2:1, 4:1, and high miscibility (blending capability) to facilitate the mixing properties. However, not all adhesive/sealants can be formulated to incorporate all of these properties. Some compound formulations that have wide mix ratios i.e., 10:1 to 100:1, wide disparities of A/B component viscosities, and/or poor miscibility do not mix thoroughly within disposable static mixers. In some cases, this has been resolved by utilizing more expensive non-disposable static mixers or dynamic mixers. The disadvantage is that these mixers are generally not disposable and require either solvent flushing, base purging, i.e. a process in which base component alone is flushed through the mixer, or quick freezing the mixer, in which a quantity of mixed compound remains, to temporarily arrest the curing reaction and thereby preserve the mixer for later use.

Polysulfide (low slump) sealants referred to above as a class of compounds is one of the more difficult thermosets to process. The typical properties are characterized by wide viscosity disparity between base and catalyst components. For example, it is not uncommon for such adhesive and/or sealant compounds to have base components characterized by viscosities of approximately 1,600,000 cps (centipoise) with the accelerator components having viscosities of approximately 2,000 cps. In addition, such compounds typically have wide mix ratios of 10:1 base and accelerator components. In order to be metered/mixed thoroughly, such compounds are commonly processed within longer non-disposable static mixers. On demand processing for direct application with these longer mixers is not efficient due to the combined size and weight of the mix tube assembly. As a result, industries have often settled upon a processing method in which mixed compound is loaded into disposable cartridges, similar to common caulking cartridges, that are immediately quick frozen and stored at sub-freezing temperatures for future use.

One process that makes use of mixing and quick freezing of thermosets is set forth in a brochure entitled "Customized Sealant Solutions" published by PPG Aerospace and available online at www.pgaerospace.com/getdoc/47d73996-f33d-45c2-a671-3879d1904d37/PRC-P. This process is generally known in the art as "Premixed and Frozen" (PMF). This PMF is a process and service offered by PPG Aerospace and other companies for mixing and freezing sealants in disposable cartridges. The compounds are mixed, packaged in cartridges quick-frozen and thereafter stored at approximately negative sixty degrees Fahrenheit. At such temperatures, the curing reaction is dramatically slowed permitting the cartridges to be stored for days or weeks. The main advantage of the PMF process is that when the sealant/adhesive compound is required for use, the cartridges are removed from frozen storage and thawed out for immediate application on the production line. The cartridge dispensing guns used with such cartridges are light and compact making PMF cartridges cost effective for small remote access applications on aerospace structures. However when PMF cartridges are used for large open access applications such as wing structures, the manufacturing efficiency of a small cartridge application is lost due to the large quantities required. Compared to bulk dispensing equipment utilizing robotic direct application, the manufacturing efficiency of cartridge dispensing is lost. In addition, when the associated costs of PMF packaging, storage, expired cartridge shelf life, cartridge waste disposal and intensive application labor are considered, PMF cartridges are not cost effective. Unfortunately, an automated solution as described above has been elusive due to the current state of art limitations for processing polysulfide sealants. The focus of the present invention is to provide an efficient and cost effective solution for the processing and application of such polysulfide sealants.

In related art, a dispensing valve, model 2151-482-001, manufactured by Nordson Sealant Equipment offers a dispensing valve utilizing a disposable dynamic static element mixer. It is an efficient for mixing for low viscosity difficult to mix compounds but is not a viable solution for mixing high viscosity compounds, such as polysulfide, especially at relatively high mixing flow rates.

U.S. Pat. No. 4,951,843 issued to Paetow sets forth a gun for dynamically mixing and discharging of a chemical mixture such as a sealant having a mixing chamber with a motor driven spindle mounted for rotation within the mixing chamber. A discharge outlet formed in the mixing chamber is controlled by a trigger mechanism to dispense material from the mixing chamber. The gun utilizes preloaded disposable material cartridges which support a rotatable motor driven spindle therein.

Published US patent application US 2008/0087683 filed on behalf of Wagner et al sets forth a dynamic mixer dispense valve utilized in mixing dental substances having a mixing chamber defining first and second flow paths for the constituent materials and a rotatable mixer.

U.S. Pat. No. 5,249,862 issued to Harold et al sets forth a DYNAMIC MIXER having a cylindrical chamber portion, the rear and of which is closed by a sealing plate which in turn supports pipe sockets adapted for direct insertion into outlet openings of cartridges from which pastry components to be mixed are supplied. Within the cartridge, a mixer impeller is rotatably supported to provide dynamic mixing of the pastry components.

Two component adhesive and sealant compounds bring substantial advantage to manufacturing operations and are, therefore, likely to be used ever more extensively in future manufacturing operations. There remains therefore a continuing and unresolved need in the art for an improved and more effective dynamic mixer dispense valve and metering apparatus suitable for use in mixing and applying high viscosity, disparate viscosity, high ratio, and/or relatively immiscible two part compounds that exhibit, short cure times. There remains a further need for such effective, dynamic mixer dispense valve apparatus which facilitates use thereof in a robotic environment and which is suitable for flexibility of application duration so as to facilitate both short shot and long path deposition of sealant and adhesive compounds while avoiding problems of unreliable interruption or termination of compound flow and the use of so-called "snuff-back apparatus attempting to reduce the long-standing and vexing problems of oozing and dribbling at shot termination.

SUMMARY OF THE INVENTION

Accordingly, it is a general object of the present invention to provide an improved and more effective dynamic mixer dispense valve and dispensing apparatus suitable for use in mixing and applying high viscosity, disparate viscosity, high ratio, and/or relatively immiscible two part compounds that sometimes exhibit short cure times. It is a more particular object of the present invention to provide such an improved and effective dynamic mixer dispense valve and metering apparatus which facilitates use in a robotic environment and is suitable for flexibility of application duration so as to facilitate both short shot and long path deposition of such two component sealant and adhesive compounds while avoiding problems of unreliable interruption or termination of compound flow between shot cycles, for example, oozing or dripping.

It is a further object of the present invention to provide an improved dispensing valve utilizing a disposable dynamic, mixer dispense valve that is integrated with a disposable cartridge mixing chamber. The mixer design is effective for processing thermosets having disparate viscosities of base and catalyst components characterized by wide mix ratios such as 10 to 1 to 100 to 1 or fluids with lower miscibility. The mixer motor drive can be directly mounted on the dispense valve for fixed stationary applications or may utilize a remote drive through a flexible drive cable shaft to reduce the size and weight of the dispense valve and thereby enable robotic articulated applications. In addition, the dispense valve includes a unique feature whereby the mixer driveshaft is actuated to the mixer tip and cartridge outlet port at the termination of a dispense cycle. This prevents flow of compressed compound present within the cartridge during the dispense cycle from flowing outwardly at the termination of a dispense cycle. This capability is critical for utilization of the present invention dynamic mixer dispense valve within robotic applications which cannot tolerate post cycle flow such as oozing or dripping onto the work substrate.

In accordance with the present invention, there is provided a viable method and apparatus that is a cost effective solution for continuous robotic application of polysulfide sealants which utilizes a disposable dynamic mixer as opposed to a static mixer. The difference between these mixers is that a dynamic mixer has a moving impeller and the static mixer has no moving parts. The static mixer consists of individual mixing elements stacked within a tube in a 90□ orientation that divide the liquid flow in both horizontal and vertical directions to create a homogeneous fluid blend. A dynamic mixer typically consists of one or more inline paddies, blades, or impellers contained in a cylinder that spin to mix the fluid into a homogeneous liquid. They typically do a better job of mixing compared to a static mixer especially with more difficult to blend liquid compounds. Most dynamic mixers are not disposable and require cleaning for reuse such as solvent flushing. Polysulfide has poor miscibility with solvents so in this case solvent flushing is not an option. Manual cleaning is not viable in production environment. This makes a disposable dynamic mixer the ideal solution for mixing polysulfide.

The invention further provides a dynamic mixer dispense valve for use in combination with metered supplies of a base component and an accelerator component to provide for continuous on demand dynamic mixing and dispensing of a mixed compound composed of the base component and accelerator component, said dynamic mixer dispense valve comprising: a valve manifold having first and second valve manifold portions defining respective first and second valve manifold passages; first and second valve assemblies having first and second material inputs for receiving supplies of base component and accelerator component respectively each operating in an open configuration allowing base component and accelerator component to flow into said first and second valve manifold passages respectively or a closed configuration in which flow of base component and accelerator component is prevented; first and second pneumatic valve actuators coupled to said first and second valve assemblies respectively each operating in response to a pneumatic input to configure said first and second valve assemblies into either said open configuration or said closed configuration; a cartridge manifold joined to said valve manifold and defining first and second cartridge manifold passages communicating with said first and second valve manifold passages; a cartridge retainer joined to said cartridge manifold defining a cartridge retainer interior and a cartridge discharge outlet; a cartridge coupled to said cartridge manifold and supported within said cartridge retainer interior defining an interior mixing chamber and a valve seat in communication with said cartridge discharge outlet; a mixer impeller defining a plurality of mixer blades and a valve cone; an impeller drive apparatus having a rotational power coupling and an impeller drive shaft, said impeller drive shaft being rotationally supported by said valve manifold and being operatively coupled to said mixer impeller to rotate said mixer impeller within said interior mixing chamber; and a pneumatic mixer actuating apparatus coupled to said impeller drive shaft operating in response to a pneumatic input to move said mixer impeller to either a closed position in which said valve cone is seated within said cartridge valve seat to prevent material flow through said cartridge discharge outlet or to move said, mixer impeller to an open position in which said valve cone is spaced from said valve seat allowing material flow through said discharge outlet.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 5 sets forth a side elevation view of a mixer impeller utilized in the present invention dynamic mixer;

FIG. 6 sets forth a front view of the mixer impeller shown in FIG. 5, utilized in the present invention dynamic mixer;

FIG. 9 sets forth a front view of an alternate embodiment of the present invention dynamic mixer dispense valve utilizing a direct drive apparatus.

DESCRIPTION OF THE PREFERRED EMBODIMENTS OF THE INVENTION

Figure 1:
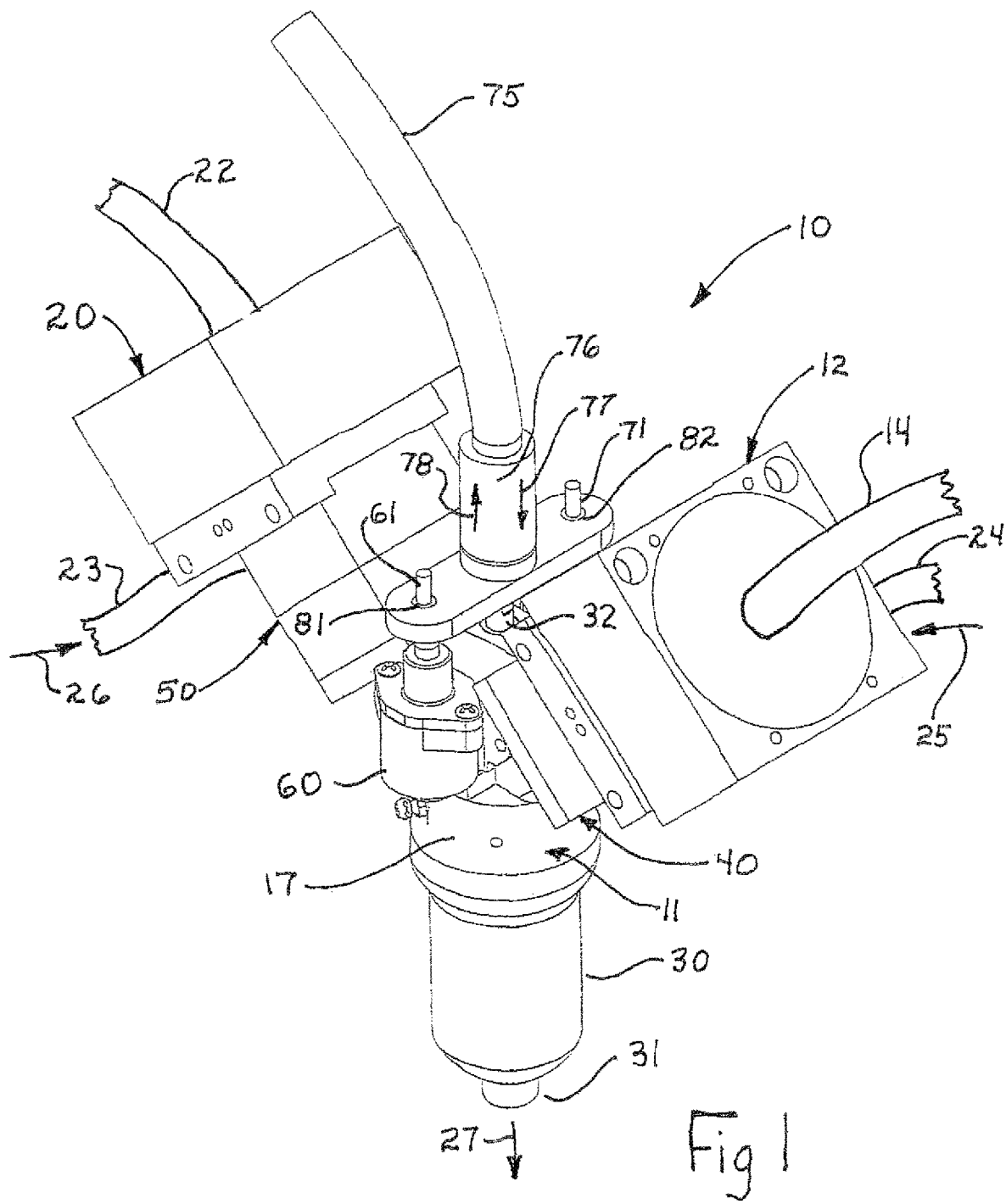
FIG. 1 sets forth a perspective view of a dynamic mixer dispense valve constructed in accordance with the present invention.

FIG. 1 sets forth a perspective view of a dynamic mixer dispense valve for two-component, high viscosity, high-ratio, disparate viscosity compounds constructed in accordance with the present invention and generally referenced by numeral 10. Dynamic mixer dispense valve 10 includes a valve manifold 11 which, as is better seen in FIG. 2, defines a generally "Y-shaped" housing having diverging upper valve manifold portions 15 and 16 supporting valve housings 40 and 50, respectively, extending outwardly at diverging angles from valve manifold 11 and a downwardly extending cartridge manifold 17 which in turn supports cartridge retainer 30. Cartridge retainer 30 is secured to cartridge manifold 17 by a conventional threaded attachment and defines a downwardly extending cartridge discharge outlet 31. In the preferred fabrication of the present invention, cartridge retainer 30 is fabricated of a high strength pressure resistant material such as steel or the like. Valve manifold 11 further supports a pair of pneumatic mixer actuators 60 and 70 (pneumatic mixer actuator 70 seen in FIG. 3) positioned on opposite faces of valve manifold 11. Pneumatic mixer actuators 60 and 70 further support a pair of upwardly extending actuator shafts 61 and 71 respectively. An elongated mixer actuator flange 80 defines a pair of apertures 81 and 82 which receive actuator shafts 61 and 71 respectively in an attachment such as threaded engagement (not shown). As is better seen in FIG. 7, mixer actuator flange 80 further defines an aperture supporting a bearing 88. Drive cable 75 is operatively coupled to an impeller drive shaft 32 by a drive coupling 76. Drive shaft 32 is rotatably supported within valve manifold 11 and extends downwardly from drive coupling 76 through mixer actuator flange 80. A pair of retainers 83 and 84 couple drive shaft 32 to actuator flange 80 in a rotational coupling. As is also better seen in FIG. 7, drive cable 75 and drive coupling 76 comprise impeller drive apparatus which couple rotational power from a convention rotational power source (not shown) to impeller drive shaft 32. Impeller drive shaft 32 is, in turn, coupled to a mixer impeller 85 for rotation within a mixer cartridge 86.

Valve assembly 40 extending upwardly and outwardly from valve manifold 11 further supports a pneumatic valve actuator 12. Similarly, valve assembly 50 extends upwardly and outwardly from valve manifold 11 and further supports a pneumatic valve actuator 20. Pneumatic valve actuator 12 is further coupled to a pneumatic control line 14 while pneumatic valve actuator 20 is further coupled to a pneumatic control line 22. Pneumatic control lines 14 and 22 are coupled to a pneumatic controller (not shown) which may be constructed in accordance with conventional pneumatic control fabrication techniques. Valve assembly 40 is coupled to a supply of accelerator component through an accelerator supply line 24. Similarly, valve assembly 50 is coupled to a supply of base component through a base supply line 23. Accelerator supply line 24 and base supply line 23 are coupled to pressurized supplies of accelerator and base components provided by pumping apparatus (not shown). While a variety of pumping apparatus may be utilized in combination with the present invention dynamic mixer dispense valve without departing from the spirit and scope of the present invention, it has been found particularly advantageous to utilize pumping apparatus manufactured by Fluidic Systems, Inc. that includes variable mix ratio and continuous metered flow capability, which are sold under the model number PK2D.

By way of overview, the operation of dynamic mixer dispense valve 10 is carried forward as dynamic mixer dispense valve 10 is supported within the desired operative environment by either a robotically operated apparatus or a manually operated apparatus (not shown) either of which may be fabricated in accordance with conventional fabrication techniques. Within the operative environment of dynamic mixer dispense valve 10, a supply of base component under pressure is provided through base supply line 23 which flows in the direction indicated by arrow 26 through valve manifold 11 under the control of valve apparatus (seen in FIG. 7) within valve assembly 50. Similarly, a supply of accelerator component is provided through accelerator supply line 24 which flows in the direction indicated by arrow 25 through valve manifold 11 under the control of valve apparatus (seen in FIG. 7) within valve assembly 40. As mentioned, the valve apparatus within valve housings 40 and 50 are set forth below in FIG. 7 in greater detail. Suffice it to note here that the valve apparatus are operative under the control of pneumatic valve actuator s 12 and 20 respectively. It will be further recognized that the operations of pneumatic valve actuator s 12 and 20 are, in turn, controlled by the air pressures applied through pneumatic control lines 14 and 22 respectively.

The individual flows of the base and accelerator components are directed by passages within valve manifold 11 (seen in FIG. 7) into the interior of mixer cartridge 86. A mixer impeller 85 (also seen in FIG. 7) is rotationally driven to mix the individual flows of base and accelerator components into a mixture compound which is dispensed outwardly in the direction indicated by arrow 27 through a cartridge discharge outlet 31 formed at the bottom end of mixer cartridge 86. Because the flows of base and accelerator components are controlled by pneumatic valve actuator s 12 and 20, the resulting flow of mixed compound dispensed through cartridge discharge outlet 31 is also controlled by pneumatic valve actuator s 12 and 20. It should noted that the mixed base and accelerator compound is a compressible compound. As a result, the flow of base and accelerator components into mixer cartridge 86 is a flow of a compressible compound under pressure which compresses the mixture creates a residual pressure within mixer cartridge 86 which, if left uncontrolled, could cause the above mentioned oozing or dribbling continuation of flow from cartridge discharge outlet 31 after the valve apparatus within valve housings 40 and 50 have closed. In accordance with an important aspect of the present invention which is described below in FIGS. 7 and 8 in greater detail, the flow of mixed compound through cartridge discharge outlet 31 is further controlled by a discharge valve mechanism operative directly upon cartridge discharge outlet 31. The nature of the discharge valve mechanism is set forth in FIGS. 7 and 8 in greater detail. However, suffice it to note here, that pneumatic mixer actuators 60 and 70 (pneumatic mixer actuator 70 seen in FIG. 3) are double acting actuators operative to raise mixer impeller 85 (seen in FIG. 7) in the direction indicated by arrow 78 to allow mixed compound flow from cartridge discharge outlet 31 and to lower mixer impeller 85 in the direction indicated by arrow 77 to prevent mixed compound flow thereby providing a discharge valve mechanism. It will be apparent to those skilled in the art that actuators 60 and 70 may, alternatively be single acting actuators combined with a return spring without departing from the spirit and scope of the present invention. The provision of this discharge valve mechanism produces a direct positive control of material flow from cartridge discharge outlet 31 in order to prevent the above described problems of material "oozing" and "dribbling" at shot cycle termination.

Accordingly, dynamic mixer dispense valve 10 is positioned for controlled dispensing of mixed adhesive and sealant compounds by properly positioning cartridge discharge outlet 31 with respect to the manufacturing work piece and thereafter operating pneumatic valve actuator s 12 and 20 to provide flows of base and accelerator components into cartridge retainer 30. Simultaneously, mixer impeller 85 (seen in FIG. 7) is rotated to, mix the base and accelerator components As the base and accelerator components are allowed to flow downwardly into mixer cartridge 86 and are mixed by mixer impeller 85, pneumatic mixer actuators 60 and 70 (pneumatic mixer actuator 70 seen in FIG. 3) are activated to lift mixer actuator flange 80 and allow mixed compound to be dispensed downwardly through cartridge discharge outlet 31 in the direction indicated by arrow 27. The flow of mixed compound is terminated at the completion of each shot cycle by closing the valve apparatus within valve housings 40 and 50 and, using pneumatic mixer actuator s 60 and 70, lowering mixer actuator flange 80 to provide positive closure of the discharge valve operative upon cartridge discharge outlet 31. This sequence of operations is carried forward to implement each shot cycle and to terminate mixed compound flow between shot cycles thereby allowing dynamic mixer dispense valve 10 to be moved across the work piece without oozing or dripping.

The operation of dynamic mixer dispense valve 10 is illustrated and described below in greater detail. However, the foregoing overview of operation will serve to illustrate a substantial number of the advantageous and inventive features of the present invention dynamic mixer dispense valve. For example, dynamic mixer dispense valve 10 provides an improved and more effective dynamic mixer and metering apparatus suitable for use in mixing and applying high viscosity, disparate viscosity, high ratio and/or relatively immiscible two part compounds that exhibit short cure times. It should also be apparent that the present invention dynamic mixer dispense valve provides an improved and effective dynamic mixer dispense valve and metering apparatus which facilitates use in a robotic environment and is suitable for flexibility of application duration so as to facilitate both short shot and long path deposition of such two component sealant and adhesive compounds. The inventive dynamic mixer dispense valve avoids problems of unreliable interruption or termination of compound flow between shot cycles by providing a direct positive valve apparatus operative upon the material flow discharge outlet. In further accordance with an additional advantage of the present invention dynamic mixer, described below, a mixer impeller operative within mixer cartridge 86 provides an optimized turbulent flow pattern for the full and complete mixing of the difficult relatively immiscible base and accelerator components. The entire drive apparatus utilized in providing rotation of the mixer impeller is constructed to operate reliably and efficiently in mixing, high viscosity, high ratio, disparate viscosity compounds.

Figure 2:
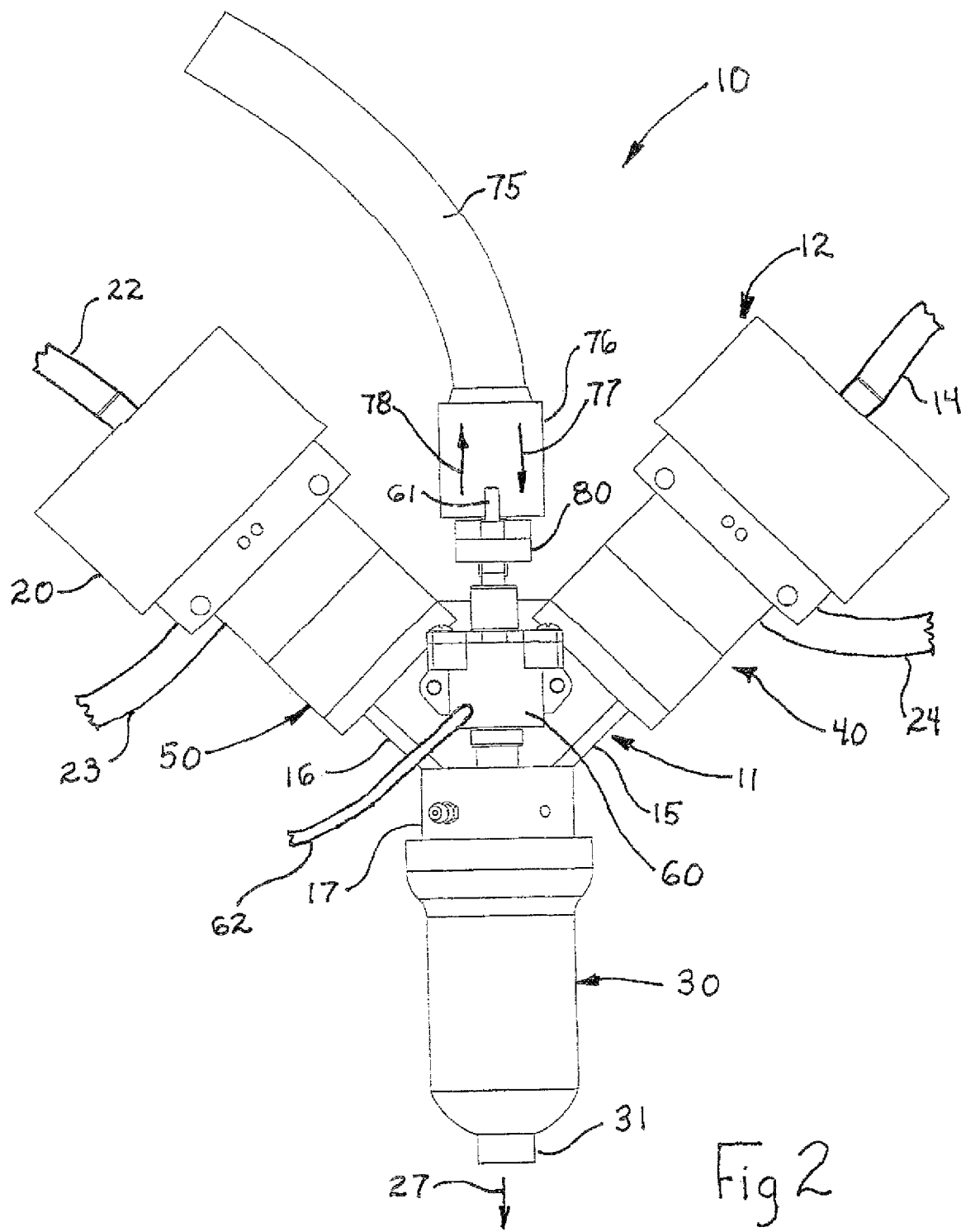
FIG. 2 sets forth a front view of the present invention dynamic mixer.

FIG. 2 sets forth a front view of dynamic mixer dispense valve 10 in a typical operating environment in which a supply of base and accelerator components under pressure are provided together with pneumatic air control lines. A conventional flexible drive cable capable of providing rotational power is also operatively coupled to dynamic mixer dispense valve 10.

More specifically, dynamic mixer dispense valve 10 includes a generally "Y-shaped" valve manifold 11 having a pair of valve manifold portions 15 and 16 which extend upwardly and outwardly together with a downwardly extending cartridge manifold 17. Valve manifold portion 15 supports a valve assembly 40 which in turn supports a pneumatic valve actuator 12. Similarly, valve manifold portion 16 supports a valve assembly 50 which in turn supports a pneumatic valve actuator 20. Valve manifold 11 further supports a pair of pneumatic mixer actuator s 60 and 70 (pneumatic mixer actuator 70 seen in FIG. 3) which in turn support and are engagingly coupled to transversely extending elongated mixer actuator flange 80. Pneumatic mixer actuator s 60 and 70 are double acting actuators and define respective actuator shafts 61 and 71 (shaft 71 seen in FIG. 3) which are received within apertures 81 and 82 defined in mixer actuator flange 80. A pneumatic control line 62 is coupled to pneumatic mixer actuator 60 while a pneumatic control line 72 is coupled to pneumatic valve actuator 70 (seen in FIG. 3). A drive cable 75 includes a drive coupling 76 which is secured to end 35 of impeller drive shaft 32 in a conventional attachment. A pair of pneumatic control lines 14 and 22 are coupled to pneumatic valve actuator s 12 and 20 respectively. A supply of base component under pressure is coupled to valve assembly 50 by a base supply line 23. A supply of accelerator component is coupled to valve assembly 40 by an accelerator supply line 24. Cartridge manifold 17 further supports cartridge retainer 30 in a threaded attachment which is better seen in FIG. 7. Mixer cartridge 86 defines a cartridge discharge outlet 31 extending downwardly through an aperture in the bottom of cartridge retainer 30.

Figure 3:
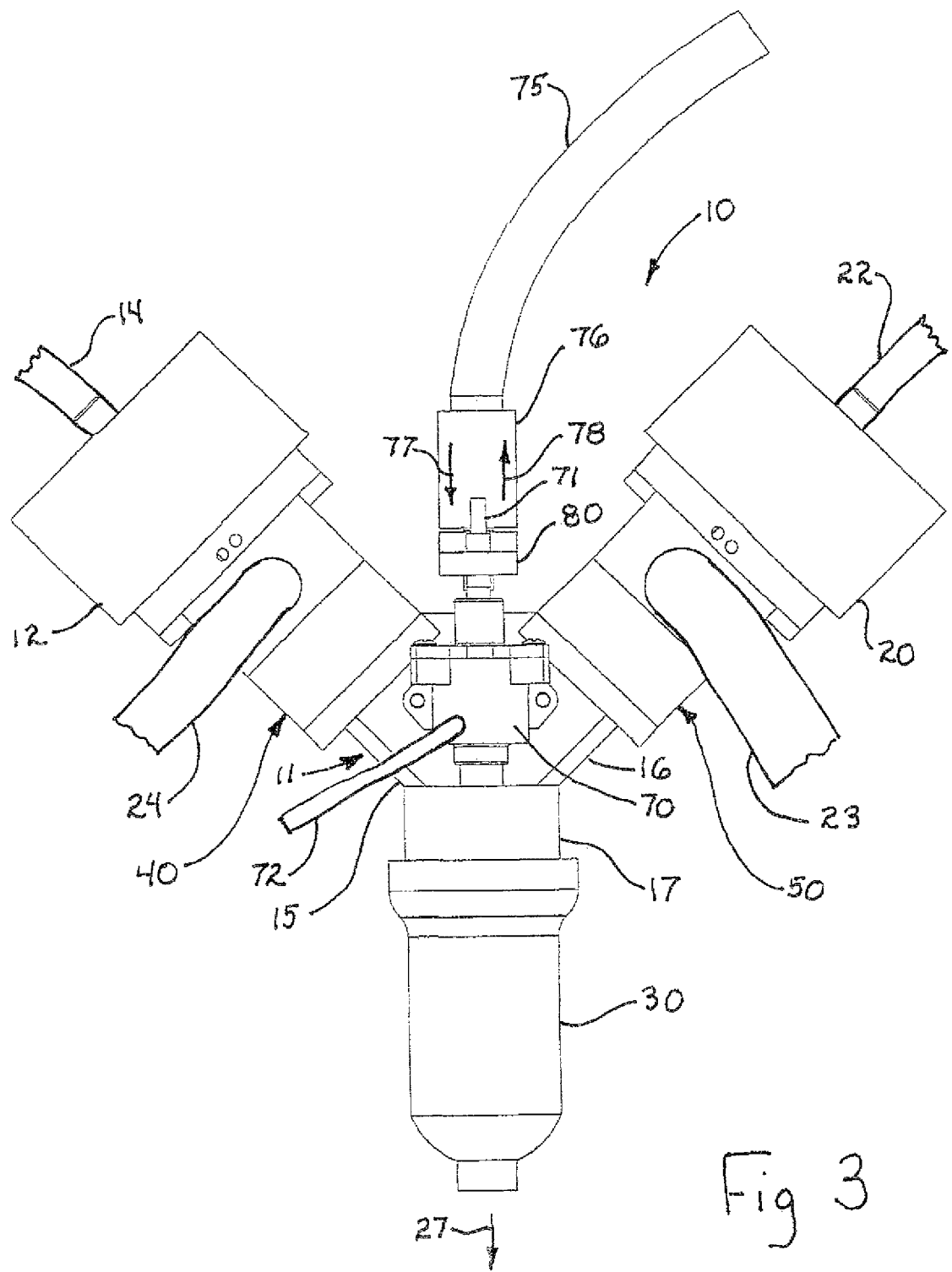
FIG. 3 sets forth a rear view of the present invention dynamic mixer.

FIG. 3 sets forth a rear view of dynamic mixer dispense valve 10 in the typical operating environment described above in which a supply of base and accelerator components under pressure are provided together with pneumatic air control lines. A conventional flexible drive cable capable of providing rotational power is also operatively coupled to dynamic mixer dispense valve 10.

As is also described above dynamic mixer dispense valve 10 includes a generally "Y-shaped" valve manifold 11 having a pair of valve manifold portions 15 and 16 which extend upwardly and outwardly together with a downwardly extending cartridge manifold 17. Valve manifold portion 15 supports a valve assembly 40 which in turn supports a pneumatic valve actuator 12. Similarly, valve manifold portion 16 supports a valve assembly 50 which in turn supports a pneumatic valve actuator 20. Valve manifold 11 further supports a pair of pneumatic mixer actuators 60 and 70 (pneumatic mixer actuator 60 seen in FIG. 2) which in turn support and are operatively coupled to transversely extending elongated mixer actuator flange 80. Pneumatic mixer actuators 60 and 70 define respective actuator shafts 61 and 71 (shaft 61 seen in FIG. 2) which are received within apertures 81 and 82 defined in mixer actuator flange 80. A pneumatic control line 72 is coupled to pneumatic valve actuator 70 while a pneumatic control line 62 is coupled to pneumatic mixer actuator 60 (seen in FIG. 2). A drive cable 75 includes a drive coupling 76 which is secured to end 35 of impeller drive shaft 32 (seen in FIG. 7) in a conventional attachment. A pair of pneumatic control lines 14 and 22 are coupled to pneumatic valve actuator s 12 and 20 respectively. A supply of base component under pressure is coupled to valve assembly 50 by a base supply line 23. A supply of accelerator component is coupled to valve assembly 40 by an accelerator supply line 24. Cartridge manifold 17 further supports cartridge retainer 30 in a threaded attachment which is better seen in FIG. 7. Mixer cartridge 86 defines a cartridge discharge outlet 31 extending downwardly through an aperture in the bottom of cartridge retainer 30.

With concurrent reference to FIGS. 2 and 3, dynamic mixer dispense valve 10 is operative to dispense mixed compound as base component, under pressure, is supplied through supply line 23 to valve assembly 50 and accelerator component is supplied, under pressure, to valve assembly 40 through supply line 24. Concurrently, rotational power is applied to mixer impeller 85 (seen in FIG. 7) through drive cable 75 and drive coupling 76. Appropriate air pressure signals are applied to pneumatic valve actuator s 12 and 20 through pneumatic control lines 14 and 22 respectively to open the valve structures within valve housings 40 and 50 to their open configurations shown in FIG. 8. Finally, appropriate pneumatic control pressures are applied to pneumatic mixer actuators 60 and 70 through pneumatic control lines 62 and 72 respectively to lift mixer actuator flange 80 and open the discharge valve at cartridge discharge outlet 31. Thereafter, base component and accelerator component flow continuously through base supply line 23 and accelerator supply line 24 through valve housings 50 and 40 respectively into cartridge manifold 17 of valve manifold 11. The two component flows are combined within mixer cartridge 86 and mixed as mixer impeller 85 (seen in FIG. 7) is rotated by drive cable 75. With mixer actuator flange 80 raised by pneumatic mixer actuators 60 and 70 in the direction indicated by arrow 78, mixed compound flows under pressure through cartridge discharge outlet 31.

The operative shot cycle for dynamic mixer dispense valve 10 is interrupted or terminated by applying appropriate pneumatic control signals to pneumatic control lines 14 and 22 which in turn close the valve structures within valve assemblies 40 and 50 respectively. These valve closures terminate the flow of base component through valve assembly 50 and accelerator component through valve assembly 40. The interruption of flow of base component and accelerator component terminates the shot cycle. However, to prevent the above described oozing or dribbling of mixed components from mixer cartridge 86 due to residual pressure therein, pneumatic mixer actuators 60 and 70 are activated to move mixer actuator flange 80 downwardly in the direction indicated by arrow 77 to provide direct positive closure of cartridge discharge outlet 31 in the manner described below. This discharge outlet closure prevents any undesired material flow following the termination of a shot cycle.

Figure 4:
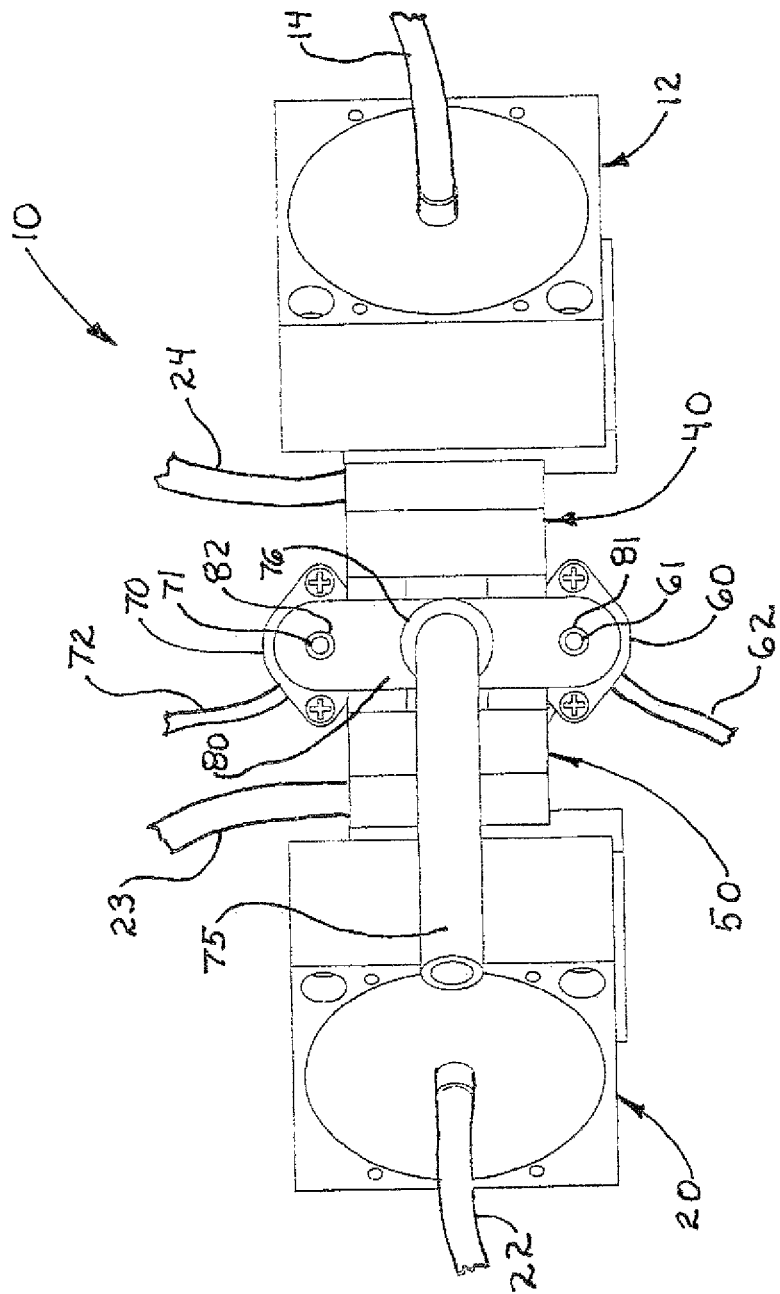
FIG. 4 sets forth a top view of the present invention dynamic mixer.

FIG. 4 sets forth a top view of dynamic mixer dispense valve 10. As described above dynamic mixer dispense valve 10 supports pneumatic valve actuator 12 and 20 each coupled to respective pneumatic control lines 14 and 22. Dynamic mixer dispense valve 10 further includes valve housings 40 and 50 supporting pneumatic valve actuator s 12 and 20 respectively. Base component supply line 23 is coupled to valve assembly 50 in the manner shown in FIG. 3. Base component supply line 23 will he understood to be coupled to a supply of base component under pressure (not shown) which may be fabricated using conventional design. Similarly, accelerator component supply line 24 will be understood to be coupled to a supply of accelerator component under pressure (not shown) which may be fabricated using conventional design. Pneumatic mixer actuators 60 and 70 are supported upon the front and rear faces of dynamic mixer dispense valve 10 and are coupled to pneumatic control lines 62 and 72 respectively. Pneumatic mixer actuators 60 and 70 include respective actuator shafts 61 and 71 extending upwardly there from. Transversely extending mixer actuator flange 80 defines apertures 81 and 82 which receive actuator shafts 61 and 71 respectively in a threaded engagement.

FIG. 5 sets forth a side elevation view of mixer impeller 85 which, by way of overview, includes a generally cylindrical impeller shaft 100, defining a valve cone end 101 and a drive end 102. Impeller shaft 100 supports a plurality of impeller blades. Mixer impeller 85 is preferably fabricated as an integral one piece injection molded component having a female threaded insert 103 molded into drive end 102. The plurality of impeller blades are radially disposed on impeller shaft 100 and extend radially outwardly from impeller shaft 100. The plurality of impeller blades are arranged in six mixing impeller stages, each mixing impeller stage having four evenly distributed radially extending impeller blades. In the preferred fabrication of the present invention, the impeller blades within alternate mixing impeller stages are angularly offset from the impeller blades of their respective adjacent mixing impeller stages by a forty five degree angle. In addition, the impeller blades of each mixing impeller stage are pitched (slanted) at pre-determined angles relative to the impeller shaft centerline with the impeller blades of alternate mixing impeller stages being pitched (slanted) upwardly and downwardly at opposite angles. As a result, mixer impeller 85 creates both foreword and rearward compound thrust and increased turbulence as it is rotated during the compound mixing process.

More specifically, mixer impeller 85 includes an elongated cylindrical shaft 100 having a valve cone end 101 and a drive end 102. A threaded insert 103 is molded into drive end 102 of shaft 100 during the shaft injection molding process. The function of threaded insert 103 is to receive the threaded end of impeller driveshaft 32 (seen in FIG. 7) in order to provide rotation of mixer impeller 85. Valve cone end 101 provides a valve stopper operative upon cartridge discharge outlet 31 (seen in FIG. 7) of mixer cartridge 86 (also seen in FIG. 7). As mentioned above, mixer impeller 85 supports a plurality of impeller blades arranged in mixing impeller stages 105, 110, 115, 120, 125 and 130. Each mixing impeller stage includes four impeller blades. Thus, mixing impeller stage 105 includes impeller blades 106, 107, 108 and 109 (impeller blades 108 and 109 not seen). Similarly, mixing impeller stage 110 includes impeller blades 111, 112, 113 and 114 (impeller blade 114 not shown). Mixing impeller stage 115 includes impeller blades 116, 117, 118 and 119 (impeller blade 119 not shown). Mixing impeller stage 120 includes impeller blades 121, 122, 123 and 124 (impeller blade 124 not shown). Mixing impeller stage 125 includes impeller blades 126, 127, 128 and 129 (impeller blades 128 and 129 seen in FIG. 6). Mixing impeller stage 130 includes impeller blades 131, 132, 133 and 134 (impeller blade 134 seen in FIG. 6). It will be noted that impeller blades 106, 116 and 126 of mixing impeller stages 105, 115 and 125 are pitched (slanted) downwardly relative to centerline 104 of impeller shaft 100. It will be understood that each of the remaining impeller blades within mixing impeller stages 105, 115 and 125 are also pitched (slanted) downwardly relative to centerline 104 of impeller shaft 100. Conversely, It will also be noted that impeller blades 112, 122 and 132 of mixing impeller stages 110, 120 and 130 are pitched (slanted) upwardly relative to centerline 104 of impeller shaft 100. It will also be understood that each of the remaining impeller blades within mixing impeller stages 110, 120 and 130 are also pitched (slanted) upwardly relative to centerline 104 of impeller shaft 100.

FIG. 6 sets forth an end view of mixer impeller 85. Of importance to note in FIG. 6 is the angular offset between the impeller blades of alternate mixer stages described above. Specifically, FIG. 6 facilitates the illustration of the pitch angles for impeller blades of adjacent mixing impeller stages and the above-mentioned forty five degree angular offset therebetween. More specifically mixer impeller 85 includes an impeller shaft 100 supporting a valve cone 101. Mixer impeller 85 further includes a mixing impeller stage 130 having radially extending impeller blades 131, 132, 133 and 134. Mixer impeller 85 further includes a mixing impeller stage 125 having radially extending impeller blades 126, 127, 128 and 129. As can be seen, impeller blades 126, 127, 128 and 129 of mixing impeller stage 125 are offset from impeller blades 131, 132, 133 and 134 of mixing impeller stage 130 by the above mentioned forty five degrees. FIG. 6 also shows the opposite pitch of impeller blades 126, 127, 128 and 129 from impeller blades 131, 132, 133 and 134. It will be understood that the identical relationships shown in FIG. 6 existing between mixing impeller stages 125 and 130 also exist between mixing impeller stages 115 and 120 as well as between mixing impeller stages 105 and 110. As is better seen in FIG. 7, the length of the impeller blades of mixer impeller 85 is sized to provide a "net fit" within mixer cartridge 86 to and sure that the impeller blades perform a wiping action upon the interior surface of mixer cartridge 86 during rotation.

Figure 7:
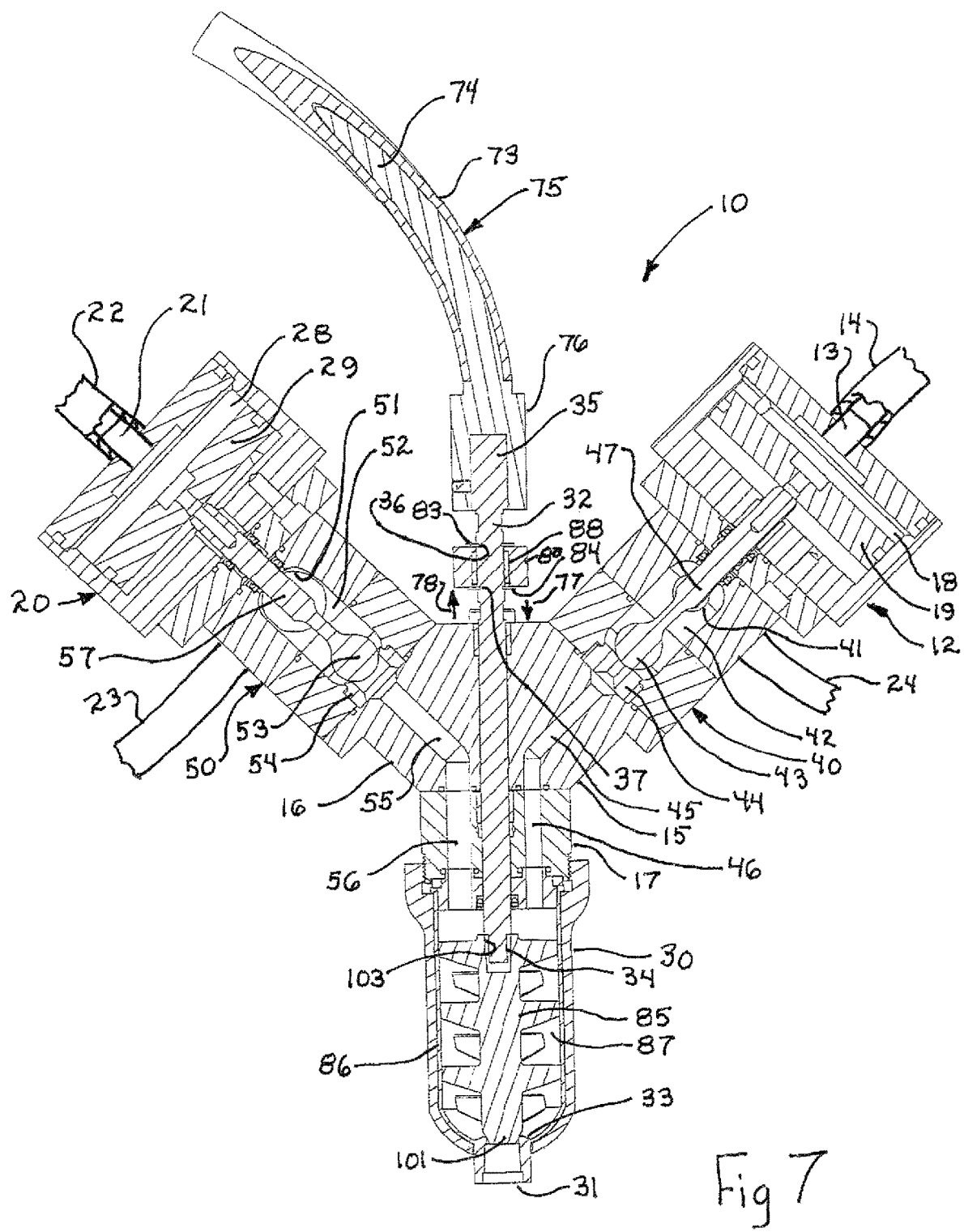
FIG. 7 sets forth a section view of the present invention dynamic mixer dispense valve in its closed inoperative configuration.
Figure 8:
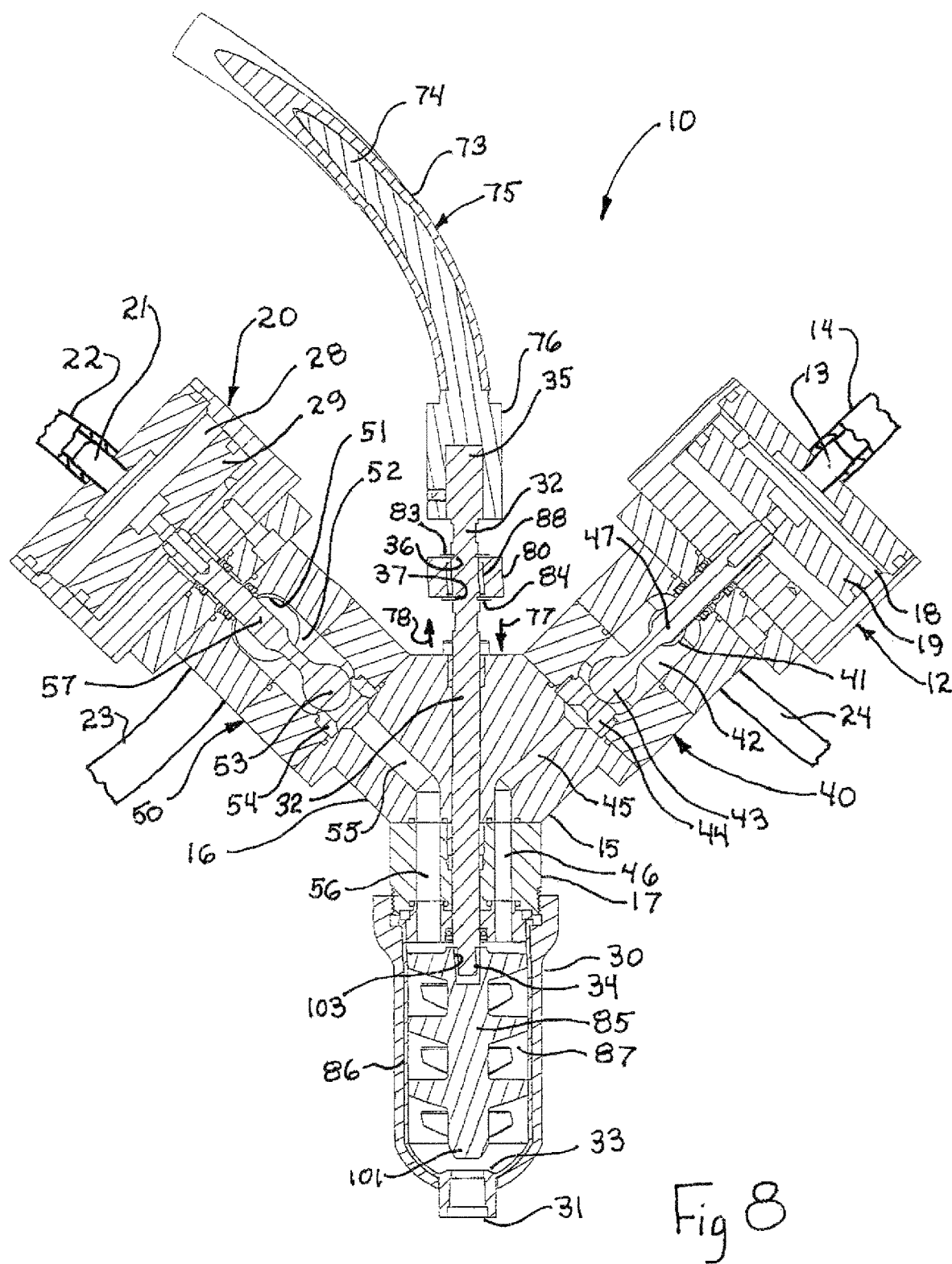
FIG. 8 sets forth a section view of the present invention dynamic mixer dispense valve in its open operative configuration.

By way of overview, FIGS. 7 and 8 set forth section view's of dynamic mixer dispense valve 10 prior to and during compound dispensing operations respectively. That is to say, FIG. 7 shows a section view of dynamic mixer dispense valve 10 during a non-operation configuration in which the components of the to be mixed adhesive or sealant are not being mixed and dispensed. Conversely, FIG. 8 shows the same section view as FIG. 7 with the difference being found in its illustration of the dispensing configuration of dynamic mixer dispense valve 10.

Thus, as mentioned above, FIG. 7 sets forth a section view of dynamic mixer dispense valve 10 in a non-dispensing configuration in which the valves controlling the flows of base and accelerator components as well as the valve operative upon the discharge outlet are all closed. More specifically, dynamic mixer dispense valve 10 includes a valve manifold 11 having angled valve manifold portions 15 and 16 together with a downwardly extending cartridge manifold 17 forming a generally "Y-shaped" housing. Valve manifold portion 15 defines a fluid passage 45 which communicates with a fluid passage 46 formed in cartridge manifold 17. Similarly, valve manifold portion 16 defines a fluid passage 55 which communicates with a fluid passage 56 formed in cartridge manifold 17. Valve manifold portion 15 further supports a valve assembly 40 which, in turn, supports a pneumatic valve actuator 12. Valve assembly 40 defines a valve port 41 which is coupled to an accelerator supply line 24 and a valve chamber 42 in communication with port 41. Valve assembly 40 further supports a valve seat 44 at the lower end of valve chamber 42 which defines a passage extending between valve chamber 42 and passage 45. Valve assembly 40 further supports an elongated valve rod 47 having a valve ball end 43 formed on the interior end thereof. Pneumatic valve actuator 12 includes an air fitting 13 coupled to pneumatic control line 14. Pneumatic valve actuator 12 further defines a cylinder 18 within which a piston 19 is movably supported by the upper end of valve rod 47.

Valve manifold portion 16 further supports a valve assembly 50 which, in turn, supports a pneumatic valve actuator 20. Valve assembly 50 defines a valve port 51 which is coupled to a base supply line 23 and a valve chamber 52 in communication with port 51. Valve assembly 50 further supports a valve seat 54 at the lower end of valve chamber 52 which defines a passage extending between valve chamber 52 and passage 55. Valve assembly 50 further supports an elongated valve rod 57 having a valve ball end 53 formed on the interior end thereof. Pneumatic valve actuator 20 includes an air fitting 21 coupled to pneumatic control line 22. Pneumatic valve actuator 20 further defines a cylinder 28 within which a piston 29 is movably supported by the upper end of valve rod 57.

Cartridge retainer 30 defines a cartridge retainer interior and is secured by threaded engagement to the lower end of cartridge manifold 17. A disposable mixer cartridge 86 is received within cartridge retainer interior of cartridge retainer 30 and defines an interior mixing chamber 87 which is in fluid communication with passages 46 and 56 of cartridge manifold 17. Cartridge 86 is preferably formed in accordance with conventional fabrication techniques and is intended to be disposable. A valve seat 33 is supported at the lower end of mixer cartridge 86 and cartridge retainer 30. Valve seat 33 defines a cartridge discharge outlet 31.

Mixer impeller 85, described above in FIGS. 5 and 6, is received within interior chamber 87. As is also described above, mixer impeller 85 defines a valve cone 101 at the lower end thereof which is received within valve seat 33 and a threaded insert 103 at its drive end 102. An elongated impeller drive shaft 32 defines a threaded end 34 which is received within threaded insert 103. Impeller drive shaft 32 extends upwardly through valve manifold 11 and passes through a bearing 88 supported within mixer actuator flange 80. Impeller drive shaft 32 defines grooves 36 and 37 above and below mixer actuator flange 80 respectively which receive retainers 83 and 84 respectively to secure impeller drive shaft 32 to mixer actuator flange 80 in a rotational attachment. Impeller drive shaft 32 terminates in an upper end 35. Upper end 35 of impeller drive shaft 32 is joined to a drive coupling 76 by conventional attachment. Drive cable 75 extends from drive coupling 76 and includes an outer sleeve 73 supporting a rotatable cable shaft 74. Drive cable 75 and drive coupling 76 are fabricated in accordance with conventional fabrication techniques such that rotational power applied to cable shaft 74 by a rotational power source (not shown) produces corresponding rotation of impeller drive shaft 32 within valve manifold 11.

In operation, supplies of base component and accelerator component are pumped under pressure through base supply line 23 and accelerator supply line 24 two valve housings 50 and 40 respectively. The base component provided by base supply line 23 flows into valve chamber 52 of valve assembly 50 through port 51 causing valve chamber 52 to be filled with base material. In the closed configuration shown in FIG. 7 a pneumatic signal coupled to pneumatic valve actuator 20 by pneumatic control line 22 provides air pressure within cylinder 28 moving piston 29 and rod 57 downwardly thereby forcing valve ball 53 against valve seat 54. In this position base material is unable to flow from valve chamber 52. Similarly, the accelerator component provided by accelerator supply line 24 flows into valve chamber 42 of valve assembly 40 through port 41 causing valve chamber 42 to be filled with accelerator material. In the closed configuration shown in FIG. 7 a pneumatic signal coupled to pneumatic valve actuator 12 by pneumatic control line 14 provides air pressure within cylinder 18 moving piston 19 and rod 47 downwardly thereby forcing valve ball 43 against valve seat 44. In this position accelerator material is unable to flow from valve chamber 42.

In accordance with an important advantage of the present invention dynamic mixer, the closed conditions of the valve mechanisms within valve housings 40 and 50 which characterize the non-dispensing condition of dynamic mixer dispense valve 10, are further enhanced by a direct positive closure of cartridge discharge outlet 31. This direct positive closure is provided by the pneumatic signals which are applied to pneumatic mixer actuators 60 and 70 through pneumatic control lines 62 and 72 respectively (seen in FIGS. 2 and 3). Returning to FIG. 7, the force provided by pneumatic mixer actuators 60 and 70 pulls mixer actuator flange 80 downwardly in the direction indicated by arrow 76. The downward movement of mixer actuator flange 80 carries impeller drive shaft 32 downwardly forcing mixer impeller 85 downwardly within cartridge chamber 87 such that valve cone 101 of mixer impeller 85 is forced against valve seat 33. The pressure of valve cone 101 against valve seat 33 provides complete closure of cartridge discharge outlet 31. Importantly the direct cartridge discharge outlet closure apparatus thus provided, prevents the above described oozing and dribbling, of mixed compound residing within cartridge chamber 87 which plagues prior art devices.

FIG. 8 sets forth a section view of dynamic mixer dispense valve 10 in a dispensing configuration in which the valves controlling the flows of base and accelerator components as well as the valve operative upon the discharge outlet are all in open conditions. This dispensing configuration of dynamic mixer dispense valve 10 is achieved by a pneumatic signal coupled to pneumatic valve actuator 20 by pneumatic control line 22 which decreases the air pressure within cylinder 28 moving piston 29 and rod 57 upwardly thereby moving valve ball 53 away from valve seat 54. In this position base material is able to flow from valve chamber 52 into cartridge chamber 87 through passages 55 and 56. Similarly, a pneumatic signal coupled to pneumatic valve actuator 12 by pneumatic control line 14 decreases air pressure within cylinder 18 moving piston 19 and rod 47 upwardly thereby moving valve ball 43 away from valve seat 44. In this position accelerator material is able to flow from valve chamber 42 into cartridge chamber 87 through passages 45 and 46. Finally, the configuration to the dispensing condition of dynamic mixer dispense valve 10 shown in FIG. 8 is completed by pneumatic signals applied to pneumatic mixer actuators 60 and 70 through pneumatic control lines 62 and 72 respectively (seen in FIGS. 2 and 3). The force provided by pneumatic mixer actuators 60 and 70 forces mixer actuator flange 80 upwardly in the direction indicated by arrow 78. The upward movement of mixer actuator flange 80 carries impeller drive shaft 32 upwardly moving mixer impeller 85 upwardly within cartridge chamber 87 such that valve cone 101 of mixer impeller 85 is moved away from valve seat 33. Once the valves within valve housings 40 and 50 together with the closure of cartridge discharge outlet 31 by mixer impeller 85 have been opened, the source of rotational power (not shown) coupled to drive cable 75 is activated to produce rotation of mixer impeller 85. The introduction of base and accelerator components into interior 87 of mixer cartridge 86 constitutes a fluid flow under pressure which would exceed the safe operating pressure of mixer cartridge 86. This pressure is contained by the additional strength provided by cartridge retainer 30 and ensures the safe operation of dynamic mixer dispense valve 10.

By concurrent reference to FIGS. 7 and 8 it will be apparent that the present invention dynamic mixer dispense valve is able to transition repeatedly between non-dispensing and dispensing conditions to provide a continuing number of shot cycles during manufacturing use of the dynamic mixer. The direct positive control of flow from cartridge discharge outlet 31 provided in the above described manner allows the dynamic mixer dispense valve to be freely and reliably move between shot cycles across the work piece without fear of undesired discharge or contamination of the work piece. The use of pressurized supplies of base and accelerator components on a continuous basis together with the operation of the novel mixer impeller operative within the mixer cartridge allows virtually endless continuous operation of the dynamic mixer. This in turn substantially improves the manufacturing efficiency and avoids the above described sources of difficulty and waste associated with prior art systems.

In accordance with an important advantage of the present invention dynamic mixer, the closed conditions of the valve mechanisms within valve housings 40 and 50 which characterize the non-dispensing condition of dynamic mixer dispense valve 10, are further enhanced by a direct positive closure of cartridge discharge outlet 31. This direct positive closure is provided by the pneumatic signals which are applied to pneumatic mixer actuators 60 and 70 through pneumatic control lines 62 and 72 respectively (seen in FIGS. 2 and 3). Returning to FIG. 7, the force provided by pneumatic mixer actuators 60 and 70 pulls mixer actuator flange 80 downwardly in the direction indicated by arrow 76. The downward movement of mixer actuator flange 80 carries impeller drive shaft 32 downwardly forcing mixer impeller 85 downwardly within cartridge chamber 87 such that valve cone 101 of mixer impeller 85 is forced against valve seat 33. The pressure of valve cone 101 against valve seat 33 provides complete closure of cartridge discharge outlet 31. Thus, the combination of pneumatic mixer actuators 60 and 70 each acting upon mixer actuator flange 80 and drive coupling 76 combined to form a pneumatic mixer actuating apparatus which operates to move mixer impeller 85 and particularly valve cone 101 with respect to valve seat 33 two provide direct positive closure of cartridge discharge outlet 31 at the termination of a shot cycle. As mentioned above, this direct positive closure avoids the problems of oozing and dribbling of the pressurized compound within the interior mixing chamber at the termination of a shot cycle.

More specifically and as is described above, dynamic mixer dispense valve 10 includes a valve manifold 11 having angled valve manifold portions 15 and 16 together with a downwardly extending cartridge manifold 17 forming a generally "Y-shaped" housing. Valve manifold portion 15 defines a fluid passage 45 which communicates with a fluid passage 46 formed in cartridge manifold 17. Similarly, valve manifold portion 16 defines a fluid passage 55 which communicates with a fluid passage 56 formed in cartridge manifold 17. Valve manifold portion 15 further supports a valve assembly 40 which, in turn, supports a pneumatic valve actuator 12. Valve assembly 40 defines a valve port 41 which is coupled to an accelerator supply line 24 and a valve chamber 42 in communication with port 41. Valve assembly 40 further supports a valve seat 44 at the lower end of valve chamber 42 which defines a passage extending between valve chamber 42 and passage 45. Valve assembly 40 further supports an elongated valve rod 47 having a valve ball end 43 formed on the interior end thereof. Pneumatic valve actuator 12 includes an air fitting 13 coupled to pneumatic control line 14. Pneumatic valve actuator 12 further defines a cylinder 18 within which a piston 19 is movably supported by the upper end of valve rod 47.

As is also described above, valve manifold portion 16 further supports a valve assembly 50 which, in turn, supports a pneumatic valve actuator 20. Valve assembly 50 defines a valve port 51 which is coupled to a base supply line 23 and a valve chamber 52 in communication with port 51. Valve assembly 50 further supports a valve seat 54 at the lower end of valve chamber 52 which defines a passage extending between valve chamber 52 and passage 55. Valve assembly 50 further supports an elongated valve rod 57 having a valve ball end 53 formed on the interior end thereof Pneumatic valve actuator 20 includes an air fitting 21 coupled to pneumatic control line 22. Pneumatic valve actuator 20 further defines a cylinder 28 within which a piston 29 is movably supported by the upper end of valve rod 57.

Cartridge retainer 30 is secured by threaded engagement to the lower end of cartridge manifold 17. A disposable mixer cartridge 86 is received within cartridge retainer 30 and defines an interior mixing chamber 87 which is in fluid communication with passages 46 and 56 of cartridge manifold 17. Cartridge 86 is preferably formed in accordance with conventional fabrication techniques and is intended to be disposable. A valve seat 33 is supported at the lower end of mixer cartridge 86 and cartridge retainer 30. Valve seat 33 defines a cartridge discharge outlet 31.

Mixer impeller 85, described above in FIGS. 5 and 6, is received within interior chamber 87. As is also described above, mixer impeller 85 defines a valve cone 101 at the lower end thereof which is received within valve seat 33 and a threaded insert 103 at its drive end 102. An elongated impeller drive shaft 32 defines a threaded end 34 which is received within threaded insert 103. Impeller drive shaft 32 extends upwardly through valve manifold 11 and passes through a bearing 88 supported within mixer actuator flange 80 and terminates in an upper end 35. Upper end 35 of impeller drive shaft 32 is joined to a drive coupling 76 by conventional attachment. Drive cable 75 extends from drive coupling 76 and includes an outer sleeve 73 supporting a rotatable cable shaft 74.

FIG. 9 sets forth a front view of an alternate embodiment of the present invention dynamic mixer, generally referenced by numeral 140, utilizing a direct motor drive apparatus for rotational power replacing the rotational power provided through drive cable 75 in the above described embodiment. The alternate embodiment of the present invention shown in FIG. 9 is identical to the embodiments set forth above in FIGS. 1 through 8 apart from the differences arising out of replacing drive cable 75 with a direct motor drive apparatus. Accordingly, it will be understood that the structure and operation of dynamic mixer dispense valve 140 is in all respects, apart from the rotational power source, identical to dynamic mixer dispense valve 10 described above. Thus, the illustrations and operations set forth and described above for dynamic mixer dispense valve 10 will also be understood to apply with equal force and effect to dynamic mixer dispense valve 140.

More specifically, dynamic mixer dispense valve 140 includes a generally "Y-shaped" valve manifold 11 having a pair of valve manifold portions 15 and 16 which extend upwardly and outwardly together with a downwardly extending cartridge manifold 17. Valve manifold portion 15 supports a valve assembly 40 which in turn supports a pneumatic valve actuator 12. Similarly valve manifold portion 16 supports a valve assembly 50 which in turn supports a pneumatic valve actuator 20. Valve manifold 11 further supports a pair of pneumatic mixer actuators 60 and 70 (pneumatic valve actuator 70 seen in FIG. 3) which in turn support and are operatively coupled to transversely extending elongated mixer actuator flange 80. Pneumatic mixer actuators 60 and 70 define respective actuator shafts 61 and 71 (shaft 71 seen in FIG. 3) which are received within apertures 81 and 82 defined in mixer actuator flange 80. A pneumatic control line 62 is coupled to pneumatic mixer actuator 60 while a pneumatic control line 72 is coupled to pneumatic mixer actuator 70 (seen in FIG. 3). A drive motor 150 is supported in combination with the remainder of dynamic mixer dispense valve 140 by conventional support means (not shown). Drive motor 150 includes an output shaft 151 coupled to a drive coupler 152 which is secured to mixer actuator flange 80 in a conventional attachment. A pair of pneumatic control lines 14 and 22 are coupled to pneumatic valve actuator s 12 and 20 respectively. A supply of base component under pressure is coupled to valve assembly 50 by a base supply, line 23. A supply of accelerator component is coupled to valve assembly 40 by an accelerator supply line 24. Cartridge manifold 17 further supports cartridge retainer 30 in a threaded attachment which is better seen in FIG. 7. Cartridge, retainer 30 defines a cartridge discharge outlet 31.

What has been shown is an improved and more effective dynamic mixer dispense valve suitable for use in mixing and applying high viscosity, disparate viscosity, high ratio, and/ or relatively immiscible two part compounds that exhibit short cure times. The improved and effective dynamic mixer dispense valve shown facilitates use in a robotic environment and is suitable for flexibility of application duration so as to facilitate both short shot and long, path deposition of such two component sealant arid adhesive compounds while avoiding problems of unreliable interruption or termination of compound flow between shot cycles such as oozing or dripping.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A dynamic mixer dispense valve for use in combination with metered supplies of a base component and an accelerator component to provide on demand dynamic mixing and dispensing of a mixed compound formed of the base component and accelerator component, said dynamic mixer dispense valve comprising:

a valve manifold having first and second valve manifold portions defining respective first and second valve manifold passages;

first and second valve assemblies having first and second material inputs for receiving supplies of base component and accelerator component respectively each operating in an open configuration allowing base component and accelerator component to flow into said first and second valve manifold passages respectively or a closed configuration in which flow of base component and accelerator component is prevented;

first and second pneumatic valve actuators coupled to said first and second valve assemblies respectively each operating in response to a pneumatic input to configure said first and second valve assemblies into either said open configuration or said closed configuration;

a cartridge manifold joined to said valve manifold and defining first threads and first and second cartridge manifold passages communicating with said first and second valve manifold passages;

a cartridge retainer joined to said cartridge manifold defining second threads cooperating with said first threads for joining said cartridge retainer to said cartridge manifold a cartridge retainer interior and a cartridge discharge outlet; a cartridge coupled to said cartridge manifold and supported within said cartridge retainer interior defining an interior mixing chamber and a valve seat in communication with said cartridge discharge outlet;

a mixer impeller defining an upper end having a threaded insert a plurality of mixer blades and a lower end having a valve cone;

an impeller drive apparatus having a rotational power coupling and an impeller drive shaft, said impeller drive shaft being rotationally supported by said valve manifold and being operatively coupled to having a threaded lower end received within said threaded insert of said mixer impeller to threadably engage and rotate said mixer impeller within said interior mixing chamber; and a pneumatic mixer actuating apparatus coupled to said impeller drive shaft operating in response to a pneumatic input to move said mixer impeller to either a closed position in which said valve cone is seated within said valve seat to prevent material flow through said cartridge discharge outlet or to move said mixer impeller to an open position in which said valve cone is spaced from said valve seat allowing material flow through said discharge outlet, said cartridge retainer and said cartridge being removable by rotation without withdrawal of said mixer impeller relative to said cartridge.

2. The dynamic mixer dispensing valve set forth in claim 1 wherein said mixer impeller includes:

an elongated impeller shaft defining a first end having an impeller drive shaft coupling for securing said first end to said impeller driveshaft and a second end and a second end defining said valve cone; and a plurality of impeller blades supported upon said impeller shaft and extending radially outwardly therefrom.

3. The dynamic mixer dispensing valve set forth in claim 2 wherein said impeller shaft is generally cylindrical and defines a shaft centerline and wherein said plurality of impeller blades are arranged in mixing impeller stages upon said impeller shaft.

4. The dynamic mixer dispensing valve set forth in claim 3 wherein said impeller blades within each of said mixing impeller stages are pitched at a selected angle with respect to said shaft centerline.

5. The dynamic mixer dispensing valve set forth in claim 4 wherein a first plurality of said mixing impeller stages is characterized by impeller blades being pitched at a positive angle with respect to said shaft centerline and a second plurality of mixing impeller stages characterized by impeller blades being pitched at a negative angle with respect to said shaft centerline.

6. The dynamic mixer dispensing valve set forth in claim 5 wherein said first and second pluralities of said mixing impeller stages are alternated upon said impeller shaft.

7. The dynamic mixer dispensing valve set forth in claim 6 wherein said impeller blades within each of said mixing impeller stages are evenly spaced upon said impeller shaft.

* * * * *